United States Patent [19]

Hedrick et al.

[11] 4,223,112
[45] * Sep. 16, 1980

[54] LACTAM-POLYOL-POLYACYL LACTAM TERPOLYMERS

[75] Inventors: Ross M. Hedrick, Creve Coeur; James D. Gabbert, St. Louis, both of Mo.

[73] Assignee: Monsanto Company, St. Louis, Mo.

[*] Notice: The portion of the term of this patent subsequent to Jun. 21, 1994, has been disclaimed.

[21] Appl. No.: 554,797

[22] Filed: Mar. 3, 1975

Related U.S. Application Data

[63] Continuation of Ser. No. 477,135, Jun. 6, 1974, abandoned, which is a continuation-in-part of Ser. No. 341,215, Mar. 14, 1973, abandoned.

[51] Int. Cl.² .............................................. C08g 81/00
[52] U.S. Cl. .................................. 525/432; 525/426; 525/434
[58] Field of Search ....... 260/78 A, 857 PE, 857 PG; 525/432

[56] References Cited

U.S. PATENT DOCUMENTS

| 2,682,526 | 6/1954 | Flory | 260/857 PG |
| 3,366,608 | 1/1968 | Lincoln | 260/30.8 R |
| 3,514,498 | 5/1970 | Okazaki | 260/857 PE |
| 3,522,329 | 7/1970 | Okazaki | 260/857 PG |
| 3,632,666 | 1/1972 | Okazaki | 260/857 PG |
| 3,639,502 | 2/1972 | Okazaki | 260/857 PE |
| 3,657,385 | 4/1972 | Matzner | 260/49 |
| 3,862,262 | 1/1975 | Hedrick | 260/857 PG |
| 4,031,164 | 6/1977 | Hedrick | 528/325 |

*Primary Examiner*—Paul R. Michl
*Attorney, Agent, or Firm*—Michael J. Murphy

[57] ABSTRACT

Lactam-polyol-polyacyl lactam block terpolymers having both ester linkages and amide linkages between the monomeric segments of the terpolymer are disclosed. Also disclosed is a process for preparing the above block terpolymers comprising reacting together a lactam, polyol and polyacyl lactam in the presence of a basic lactam polymerization catalyst to form a lactam-polyol-polyacyl lactam block terpolymer.

6 Claims, No Drawings

LACTAM-POLYOL-POLYACYL LACTAM TERPOLYMERS

RELATED APPLICATION

This is a continuation of application Ser. No. 477,135 filed June 6, 1974 now abandoned, a Continuation-in-Part of application Ser. No. 341,215, filed Mar. 14, 1973, now abandoned.

BACKGROUND OF THE INVENTION

This invention pertains to lactam-polyol-polyacyl lactam block terpolymers and their process of preparation.

Polyamides comprise a large class of polymers having a wide range of properties. Many polyamides have excellent combinations of properties for particular applications. One important class of polyamides are the polylactams prepared by the polymerization of lactams such as caprolactam and the like. Polycaprolactam, more commonly known as nylon 6, is the most widely used of the polylactams because of its excellent mechanical and physical properties and its low cost. Because of the many desirable properties of polylactams, polylactams other than polycaprolactam have been used to a considerable extent when nylon 6 is unsuited to some specific end use. Nylon 12, manufactured from lauryllactam or 12-aminododecanoic acid, is an example of such a polymer. The foregoing polymer is characterized by lower water absorption and consequently better dimensional stability and electrical properties than nylon 6. Nylon 12 is also more flexible and lower melting than nylon 6.

For still other applications, a polyamide having a higher water absorption coupled with a higher elasticity than nylon 6 would be useful for a number of applications. Some nylon copolymers are known to provide the characteristics just mentioned. Polyamide-polyether copolymers are known to have a combination of properties making them suitable for use as fibers, fabrics, films and molded articles. It is also known that lactam-polyol copolymers can be prepared by the base catalysis of lactams in the presence of polyalkylene glycols or other polymerizable polyol intermediates using isocyamate initiators. This method of polymerization yields a block copolymer with a number of good properties at a reasonable cost. One of the principal disadvantages of the polylactam-polyether copolymers prepared by this method has been the poor heat stability of the copolymers.

SUMMARY OF THE INVENTION

If a means could be found for improving the heat stability of lactam-polyol copolymers prepared by an anhydrous base-catalyzed polymerization, it would represent a significant advance in the state of the art. Providing a heat-stable lactam-polyol polymer constitutes one of the principal objects of this invention.

The present invention pertains to lactam-polyol-polyacyl lactam terpolymers having both ester linkages and amide linkages between the monomeric segments of the terpolymer.

The invention also pertains to a process for preparing the above polymers comprising reacting together a lactam monomer, a polyol and a polyacyl lactam in the presence of a base catalyst for the anhydrous polymerization of a lactam.

DESCRIPTION OF THE PREFERRED EMBODIMENTS

The polymerized lactam component of the above polymers is formed from cyclic monomeric lactams of the formula

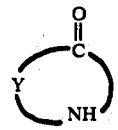

where
Y is an alkylene group having at least about three carbon atoms, preferably from about 3 to 12 or 14, and more preferably from about 5 to about 11, carbon atoms.

A preferred monomer is ε-caprolactam. Lactam monomers in addition to ε-caprolactam include α-pyrrolidinone, piperidone, valerolactam, caprolactams other than the ε-isomer, capryllactam, lauryllactam and the like. In addition to lactams unsubstituted on their carbon chains, lactams having substituents on the carbon chain which do not inhibit or otherwise adversely affect the polymerization of the lactam are also included within the scope of this invention.

During polymerization the cyclic lactam ring is opened to provide the following monomeric unit $$-\overset{O}{\underset{\|}{C}}-Y-NH-$$

which, together with other lactam molecules, produces a polymeric block of the formula

where
x is an integer greater than one. The monomeric lactam unit can also react with the polyacyl lactam. Similarly, a polylactam block, when joined with a polyacyl lactam, forms a polymer segment of the formula

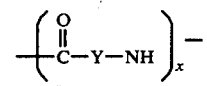

where
R is a hydrocarbon group described hereinbelow, A and A' are acyl groups,
x is an integer greater than one and
y is an integer equal to or greater than one.

Thirdly, in the course of the polymerization of the components described above, a polyol can react with the polymerizable lactam unit or block to produce a polymer segment of the formula

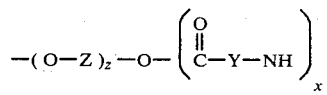

where
- x and z are integers equal to at least one and where
- Z is a hydrocarbon, substituted hydrocarbon or acylated hydrocarbon group which, together with the oxygen atom attached thereto, forms a polyether or polyester segment of a polymer molecule.

The Z hydrocarbon, substituted hydrocarbon and acylated hydrocarbon groups can be of any size, even polymeric such as polybutadiene, but are generally limited to about six carbon atoms, said groups being preferably alkylene, arylene, alkylene carbonyl, arylene, carbonyl, and mixtures thereof. Even more preferred are unsubstituted aliphatic groups such as methylene, ethylene, propylene, butadienyl, and the like. Other suitable Z groups include phenylene, chlorophenylene, tolylene, isobutylene, isopropylene, ethylcarbonyl, propylcarbonyl, ethylsulfonyl, propylthiocarbonyl and the like.

The preference indicated above for unsubstituted aliphatic Z groups means that terpolymers of this invention which contain polyether segments are preferred over other embodiments which contain polyester segments.

In preferred aspects of this invention, it is theorized that the lactam is present in the polymer in the form of polylactam blocks which are alternated with blocks of polyol to form the polymer. The polylactam blocks when present can be of any size but customarily have molecular weights of at least about 500, preferably at least about 1000.

The polymerized polyol components of the polymers of this invention are formed from polyol intermediates having at least two hydroxy groups. Available commercial polyols of this class are produced by reacting for example, propylene oxide or ethylene oxide with glycols, glycerol, pentaerythritol, glucose, amines and the like. Included within the scope of the above class are a large number of suitable compounds ranging from the simple diols such as ethylene glycol to complex polymeric polyols such as poly (ε-caprolactone) diol. Other polyol compounds include alkylene glycols such as diethylene glycol, triethylene glycol, tetraethylene glycol, tetramethylene glycol, propylene glycol, dipropylene glycol, hexylene glycol, 1,2-propane diol, 1,3-propanediol, 1,3-hexanediol, 1,5-pentenediol, butylene glycol, 1,4-butanediol, dicyclopentadiene glycol, heptaethylene glycol, and isopropylidene bis (p-phenyleneoxypropanol-2); diols other than alkylene glycols such as pyrocatechol, resorcinol, hydroquinone, hydroxyethyl acrylate and hydroxypropyl methacrylate; polyols having more than two hydroxy functions such as glycerol, pentaerythritol, 1,2,6-hexanetriol, 1-trimethylol propane, pyrogallol and phloroglucinol; polymeric polyols such as polyethylene glycols, polypropylene glycols, polyoxypropylene diols and triols, castor oils, polybutadiene glycols and polyester glycols, and a large number of compounds containing substituent other than hydroxy groups such as 2,4-dichlorobutylene glycol and 2,2'-4,4'bis(chlorohydroxyphenyl) ether. In addition to all the hydroxy compounds set forth above, the thio compounds analogous to the above compounds having sulfur atoms in place of oxygen are also included within the scope of the invention. A few samples include hydroxyethyl thioglycolate, ethylene glycol bis-(thioglycolate), penterythritol tetrakis(thioglycolate) and thiodiglycol.

If the polyol intermediate is a polymer, the molecular weight of the polyol can be any amount. Commercially available polymeric polyol compounds have molecular weights from 200 to 5000, but polymers with molecular weights outside that range are also useful in the practice of the instant invention.

The third component of the terpolymers of this invention has the following structural configuration in the polymer chain:

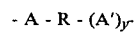

where
- R is a hydrocarbon group,
- A and A' are acyl radicals and
- y is an integer equal to at least one.

The R group can be any hydrocarbon group having at least two valence bonds for attachment to the acyl groups shown in the above formula. Examples include functional groups obtained by the removal of hydrogen atoms from methane, ethane, propane, hexane, dodecane, benzene, toluene, cyclohexane and the like. The polyvalent R group can be of any size but is preferbly limited to about twenty carbon atoms, and more preferably about eight carbon atoms. If the integer "y" is one, the linkage will be a diacyl group. The A groups can be any acyl group and preferably are

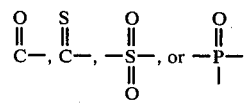

groups. Most preferred among the above groups is the carbonyl group.

Values for the integer "y" have a direct relationship to the thermoplasticity of the terpolymer. If the integer "y" is greater than one, the linkage will be a higher polyacyl group. The higher the value of "y", the more highly crosslinked will be the finished polymer. Values for "y" can be as high as six or eight, but more preferably do not exceed two or three.

The polymerized product comprising the aforementioned components can have a number of different structures depending upon the process conditions and the relative proportions of ingredients used in the reaction system. Polymers can be prepared having relatively small segments of lactam units joined to similarly short segments of polyol units through the polyacyl linkage described above. Or large segments of one polymeric component can be combined with a larger number of comparatively small segments of another polymeric unit, which small segments are joined to one another through the polyacyl linkage as well as to the other type of polymeric component. Or segments of varying sizes of both the lactam and the polyol polymeric units can be combined through the polyacyl components to form a highly random terpolymer. Another form of polymer within the scope of this invention are block polymers, where moderately large size blocks or segments of the lactam and polyol polymeric units are positioned alternately in the polymer chain and joined through the polyacyl group described above. If the polyacyl linkages are, for purposes of simplification, considered to be a part of either a lactam or polyol block, then the block polymers of this invention can be discussed in terms of two alternating blocks designated as A and B blocks, instead of in terms of complicated patterns of three blocks designated as A, B and C blocks. Block polymers of this invention can have three general structural configurations, AB, ABA and a repeating pattern of AB segments. Following a general characterization of a block copolymer within the scope of this invention as AB, ABA or repeating AB, it should be recognized that the exact structural configuration may vary somewhat from the general characterization of the polymer. As an illustration, one theoretical formula for a lactam-polyol-polyacyl lactam block terpolymer of the repeateing AB type could be

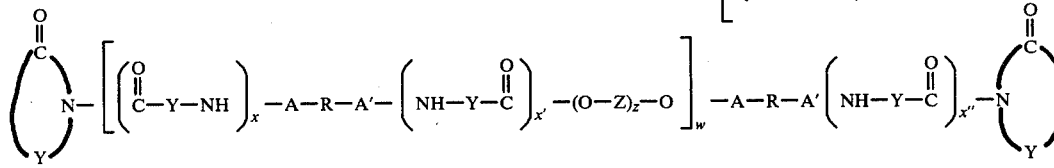

where
x, x', x", z and w are all integers equal to one or more,
R and Z are divalent hydrocarbon groups,
Y is an alkylene group having at least three carbon atoms, and
A and A' are acyl groups.

If for instance Y is a straight chained amylene group, A and A' are carbonyl groups, Z is ethylene, —CH$_2$CH$_2$—, and R is phenylene, the terpolymer would be a caprolactam-ethylene glycol polymer where the caprolactam segments of the polymer are joined to one another and to the ethylene glycol segments through terephthaloyl linkages. Other lactam-polyol polymers, both of the AB, ABA as well as the repeating AB type, will become immediately apparent to those skilled in the art in view of this disclosure. It should therefore be noted that the above structural formula is set forth for illustrative purpose only, and is not intended as a limitation of the polymers within the scope of the invention.

When the polymers of this invention are of the ABA type, where one block of one type of polymer segment is located between two blocks of the other type of polymer segment, the polymers can be of either the polyol-lactam-polyol type or the lactam-polyol-lactam type. Of the two types, the latter is a preferred type of ABA polymer.

If the lactam-polyol-polyacyl lactam polymer is a block polymer, the polyol blocks can, like the polylactam blocks, be of any size but customarily have molecular weights of at least about 500, preferably at least about 1000. The ratio of the number of lactam to polyol blocks can also vary. Since the block polymers can be of either the type designated as AB, ABA or repeating AB, the ratio of lactam blocks to polyol blocks can vary from 2:1 to 1:1 to 1:2. Mixtures of two or more block polymers having different ratios of the lactam and polyol blocks will produce ratios of polymer blocks intermediate between the above stated ratios.

In the above theoretical formula for a lactam-polyol block terpolymer, the polyacyl linkage is represented as located between two lactam polymer segments as well as between a polyether segment and a lactam polymer segment. As a practical matter, the polyacyl linkages will also be located occasionally between two polyol blocks. It should be noted, moreover, that the polyacyl linkages need not invariably be positioned between lactam and polyol blocks since the necessary ester or amide linkages can be provided in the form of an ester linkage by the oxygen atom of the polyester segment and the carbonyl group of a polylactam segment.

Following is a general characterization of the lactam-polyol-polyacyl lactam block terpolymer. As an illustration, the lactam-polyol-polyacyl lactam block terpolymer of the invention has the general formula:

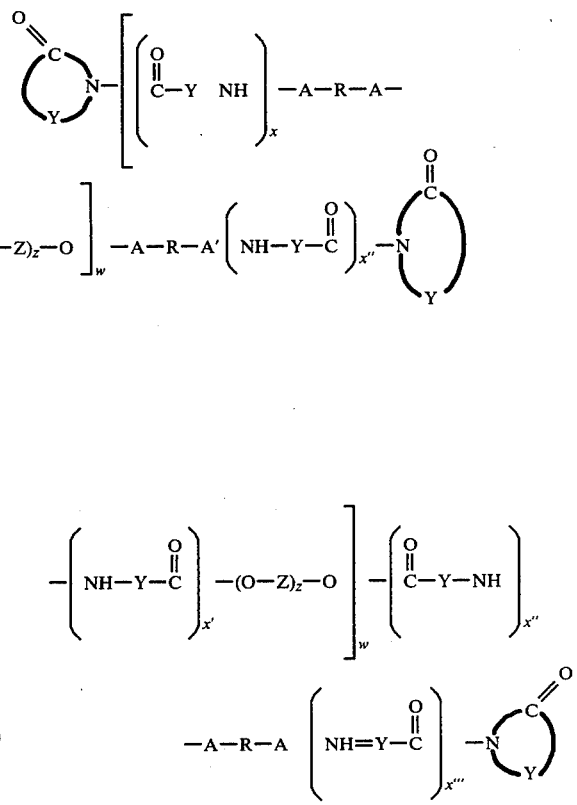

Wherein
(O—Z)$_z$ is a polymeric moiety and Z is a hydrocarbon or substituted hydrocarbon group said group being alkylene, arylene, alkylene carbonyl, arylene carbonyl, and mixtures thereof;
A is a carbonyl group;
R is a divalent or polyvalent hydrocarbon group;
Y is a an alkylene or substituted alkylene having from about 3 to about 14 carbon atoms; x, x', X", and x'" are integers and the total number of x's is equal to 2w+2; and z and w are integers equal to one or more.

As mentioned earlier, the terpolymers of this invention are characterized by the presence of both ester and amide linkages between the monomeric segments of the polymer. The term "monomeric segment" is intended to apply to the polymerized reaction product of a monomer, whether the reaction product is a single unit such as

or a block of several units such as

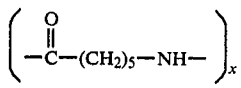

Regarding the breadth of the terms "ester linkage" and "amide linkage", the linkages can of course be composed of acyl groups other than carbonyl groups since the polyacyl linkage described above includes thiocarbonyl, sulfonyl, and phosphoryl groups as well as the more conventional carbonyl groups.

The molecular weight of the terpolymers can vary widely from a number average molecular weight of just a few thousand to one million or higher. For thermoplastic uncrosslinked polymers, a preferred range for number average molecular weight is from about 10 or 20,000 to about 100,000 to 200,000. If the polymers are crosslinked, the molecular weights of the polymers can be much higher in the range of 100,000 to several million.

When block polymers are formed, the molecular weight of the polyol blocks is an important consideration in selecting preferred polymers within the scope of this invention. Polyol blocks having a number average molecular weight of about 500 or 600 or more generally tend to have good low temperature properties. This minimum level of molecular weight for the polyol blocks is subject to some variation insofar as low temperature properties can also be affected by the degree of block polymerization, the nature of the block polymer, i.e. AB, ABA or repeating AB, the ratio of the lactam content to the polyol content, and the particular lactam and polyol present in the polymer. Regarding a maximum molecular weight of the polyol blocks, preferred polymers have polyol blocks with a number molecular weight of about 6000, and more preferably about 4000. Above these levels some of the polyol molecules tend to exhibit a reduced hydroxyl functionality, thereby making more difficult the incorporation of polyol into the polymer.

In addition to the three principal monomeric constituents which together produce the terpolymers of this invention, other polymerizable monomers can also be used to prepare polymers having four or more polymerizable constituents. As an example, if the polyol constituent of a terpolymer of this invention is polybutadiene diol, the resultant terpolymer could be, after the lactam-polyol-polyacyl lactam polymerization, subsequently reacted with a vinyl compound such as styrene to crosslink the polymer through its vinyl unsaturation. Still other monomers could be chosen which could be polymerized directly into a linear polymer chain. The quantity of such additional monomers could be very large, even as great as 50% or more of the total polymerizable constituents but preferably is limited to quantities of 25% or less of the total monomer content.

The polymers of this invention exhibit a broad range of properties which can be adjusted to provide compositions particularly well adapted for a specified end use. In addition to crosslinking, adjustment of polymer structure, and molecular weight adjustment of polymer blocks, other means of varying the properties of the polymers can also be employed. Crystallinity of the polymers, which can be present in the lactam segments of the polymers, can be increased or decreased by variation of polymerization temperatures. Since any crystallinity in the polymers of this invention is largely present in the lactam segments of the polymer, variation of the lactam content of the polymer can also result in a variation of polymer crystallinity. Polymers with relatively high degrees of crystallinity tend to be strong, rigid polymers whereas those with little or no crystallinity are more elastomeric in nature.

As mentioned earlier, the type of lactam, polyol and polyacyl lactam components can also affect the properties of the finished polymer. As an example, polyethylene glycol polymer segments tend to produce polymers with a high water absorptivity whereas polypropylene glycol or polytetramethylene glycol polymer segments produce polymers with comparatively low water absorptivities. As another example, caprolactam polymer segments in the polymers of this invention produce polymers which are stronger and more rigid than homologous polymers containing segments of a higher lactam such as caprylactam or dodecanolactam. With respect to the polyacyl lactam, an aromatic hydrocarbon group between the acyl lactam groups will produce a more rigid terpolymer than will a polyacyl lactam with a long-chain aliphatic group. Even more significantly, use of a lactam will yield an essentially linear polymer whereas use of a tris or tetrakislactam will result in a branched or crosslinked terpolymer. Similarly bis-lactams can be employed to produce a branched or crosslinked polymer. Highly crosslinked polymer can be made through the use of polyols having more than two hydroxy groups.

With all of the foregoing techniques available for modifying and adjusting the properties of the polymers of this invention, it can be appreciated that the polymers can be used in a number of end use applications. One such use is as textile fiber. Throughout the entire range of ratios of polymeric components, from polymers containing very little polyether component to those containing a large amount, the polymers have properties which make them useful as textile fibers. In addition to being the sole constituent of a textile fiber the terpolymers can also be used as are component in a composite or conjugate fiber. It is contemplated that conjugate fibers of nylon and the terpolymers of this invention will be particularly useful in a number of textile and other applications. Other textile applications for the terpolymers include their use in the manufacture of non-woven fabrics and as high moisture regain fibers. The terpolymers can also be manufactured into foamed articles, either during or after their polymerization, to produce rigid and flexible foams. Because of their method of preparation directly from the monomeric components, the polymers can be prepared in large shapes such as furniture and furniture components and automobile parts. The terpolymers can also be produced in the form of molding resins which can subsequently be molded by injection molding, extruding, thermoforming or other techniques to produce products of virtually any shape. The more highly elastomeric compositions can be used in the manufacture of automobile tires and tire components. The polymers can also be modified with fillers, fibers, pigments, dyes, stabilizers, plasticizers, flame retardant and other polymeric modifiers to alter their properties and thereby enlarge even further the scope of their applicability. One such modification comprises reinforcing the polymers with fillers or fibers which have been treated with coupling agents capable of increasing the bonding of the fillers or fibers to the polymer molecules. A large number of organosilane compounds have been found to be especially capable of performing this task of improving adhesion between polymer and filler or fiber. Examples of some suitable organosilane couplers for use with the polymers of this invention include 3-aminopropyl triethoxysilane, glycidoxypropyl trimethoxysilane and N-trimethoxysilylpropyl-N-β-amino-ethyl)-amine. Preferred fillers and fibers include quartz, wollastonite, feldspar, calcined kaolin clay, glass fibers and other high performance fibers such as graphite, boron, steel and the like. The concentrations of fillers and fibers can vary from very small amount such as one or two volume percent up to 70 or 80 volume percent or more.

The polymers are prepared by mixing together lactam monomer, polyol, lactam polymerization catalyst and a polyacyl lactam of the formula

where
A and A' are acyl groups selected from

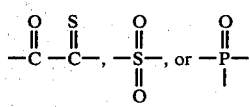

where
Y is alkylene group having at least about three carbon atoms,
where
R is a divalent or polyvalent hydrocarbon group, and
where
y is an integer equal to at least one, and
conducting the polymerization of the lactam, polyol and polyacyl lactam under conditions which will cause the lactam to polymerize.

Polymerization temperatures can vary from the melting point of the lactam or less up to the melting point of the resultant polymer or more. Depending upon the particular ingredients being used, this can encompass a range from 70° to 230° C. or more. Preferred polymerization temperatures are from about 90 to about 190° C., and more preferably from about 120° to about 180° C. for caprolactam terpolymers. Even more preferred is a polymerization where the temperature is increased during the polymerization from an initial temperature of from about 70° to about 100° C. at the beginning of the polymerization to a final temperature of about 150° to 180° C. Such a technique produces a rapid polymerization of a terpolymer having high strength and modulus.

Times required for complete polymerization will vary considerably depending upon polymerization temperatures and the specific ingredients used in the polymerization system. Total polymerization time can be as little as 30 seconds or less, preferably from 1 to 10 minutes, and can be extended to any duration up to several days or more. Generally, polymerization times of from 1 to 10 minutes are preferred for most polymerization systems.

The lactam monomer and polyol used in the polymerization have both been described in ample detail above. The lactam polymerization catalyst useful herein includes that class of compounds commonly recognized as suitable basic catalysts for the anhydrous polymerization of lactams. In general, all alkali or alkaline earth metals are effective catalysts either in the metallic form or in the form of hydrides, halohydrides, alkylhalides, oxides, hydroxides, carbonates and the like. Also useful are a number of organometallic compounds of the metals mentioned above such as metal alkyls, metal phenyls, metal amides and the like. Examples include sodium hydride, potassium hydroxide, lithium oxide, ethyl magnesium bromide, calcium fluorohydride, strontium carbonate, barium hydroxide, methyl sodium buthyl lithium, potassium phenyl, diphenyl barium, sodium amide and magnesium diethyl. All of the foregoing compounds react with the lactam monomer to form the metal lactam, which is the active catalytic agent in the lactam polymerization mechanism. The metal lactam catalyst can therefore be formed in situ by reaction of one of the foregoing metals or metal compounds with lactam monomer in the polymerization medium or by prior reaction of the metal or metal compound with a stoichiometric quantity of lactam monomer. Examples of metal lactam catalysts include sodium caprolactam, magnesium caprolactam, bromomagnesium pyrrolidinone, chlorocalcium caprolactam and the like. Catalyst concentrations can range from a fraction of one mole percent to 15 to 20 or more mole percent of the lactam monomer to be polymerized.

The polyacyl linkage, as well as the ester and amide-linkages, are incorporated into the polymer chain through the reaction of the polyacyl lactam with the lactam and polyol constituents. In the formula set forth above for the polyacyl lactams useful herein, the R group can be any hydrocarbon group having the necessary number of available valences to bond to itself all of the acyl groups included in the compound. The hydrocarbon group can be of any size but preferably contains a maximum of eight or ten carbon atoms. Examples of suitable R groups include phenylene, biphenylene, methylene, hexylene, tolylene, and analogous hydrocarbons having more than two sites available for bonding to acyl groups. The integer "a" preferably is from one to about three. The A and A' groups can be carbonyl, thiocarbonyl, sulfonyl, or phosphoryl. The Y group can represent any alkylene chain having from 3 to 14 or more carbon atoms, preferably from about 3 to about 10 carbon atoms. Preferred among the class of polyacyl lactams included within the scope of the formula given above are those where the A and A' groups are carbonyl groups. Particularly preferred are those compounds where A and A' are carbonyl, where R is either alkylene or phenylene, Y is a five-membered alkylene group and the integer "a" is one.

Examples include terephthaloyl bis-caprolactam, i.e.

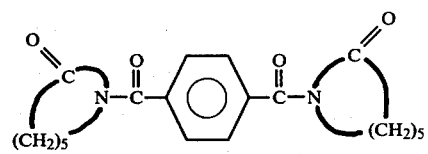

adipoyl bis-caprolactam; malonyl bis-pyrrolidinone; succinoyl bis-pyrrolidinone; glutaroyl bis-piperidone; glutaconoyl bis-piperidone; 2-ethyl-2-phenyl-glutaroyl bis-valerolactam; 2,3-diethylsuccinoyl bis-caprolactam; pimeloyl bis-capryllactam; sebacoyl bis-caprolactam phthaloyl bis-piperidone; isophthaloyl bis-dodecanolactam; trimesoyltris-caprolactam; (1,3,5-benzene tricarbonyl-tris-caprolactam); 1,2,3,5-benzenetetracarbonyl tetrakis-caprolactam; 1,2,3,4-napthalenetetracarbonyl-tetrakis-piperidone and 1,4-cyclohexanedicarbonyl bis-caprolactam; 1,3-benzene disulfonyl caprolactam; 3-(sulfonyl caprolactam)-benzoyl caprolactam; phosphoryl tris-caprolactam; benzene phosphoryl bis-caprolactam; and dithio-terephthaloyl bis-caprolactam.

The amount of polyacyl lactam useful in the preparation of the terpolymers of this invention depends upon the quantities of lactam and polyol being used. For preferred polymerizations, it is desirable that the polyacyl lactam be present in an amount from 100 to about 500, preferably from about 100 to about 200, equivalent percent of the polyol. If the polyacyl lactam is present in an amount less than a molecularly equivalent amount based on the polyol, polyol prepolymer formation occurs, but the subsequent lactam polymerization is very slow. In those preferred polymerization systems where the polyacyl lactam concentration exceeds the amount stoichiometrically equivalent to the polyol, the excess can be from 0.01 to about 30 or more mole percent of the lactam monomer. A preferred range is from about 0.1 to about 10 mole percent of the lactam monomer, and more preferably from about 0.2 to about 5 mole percent of the lactam monomer.

The lactam and polyol can be present in any relative proportions ranging up to 99 parts of either component to 1 part of the other. Preferred ratios of the two polymer-forming materials depend upon the end use to which the finished polymer is to be put. For end use applications requiring strong rigid materials, the lactam content of the polymerizable medium should be relatively high such as 60 or 80 or even 90% or more lactam. For other applications where elastomeric properties such as high elongation or where water absorption is desirable, the relative proportions of the two monomers can be reversed so that the polymerizable medium will contain 60 to 80 or 90% or more of the polyol compound. Polymers containing about equal quantities of both lactam and polyol are preferred for a great many uses because of the advantageous combination of properties achieved by such polymers.

Example 1

A quantity of 2,100 grams of ε-caprolactam is heated under a vacuum to remove water. The heating is continued until 100 grams of the caprolactam is removed from the reaction vessel. The caprolactam is then allowed to cool, after which 725 ml of pyridine is added. The mixture is then allowed to cool further to about 40° C., after which time 609 grams of teraphthaloyl chloride is added at a rate sufficient to keep the pot temperature at about 80° to 90° C. The mixture is then heated to 135° to 140° C. for two hours. After that time, the resultant solution is poured into 14 liters of ice water to precipitate the product, terephthaloyl bis-caprolactam. The precipitate is filtered and washed three times with cold water and once with methanol. Following the washing, the powder is dried at 50° C.

Seven different caprolactam-polypropylene glycol-terephthaloyl bis-caprolactam terpolymers are prepared using the quantities of ingredients specified in the following table.

In all of the following tables reporting quantities of ingredients used in the several polymerization systems, the quantities are expressed in parts by weight.

TABLE 1

| Material | A | B | C | D | E | F | G |
|---|---|---|---|---|---|---|---|
| Pluracol 2010* | 328.4 | 281.1 | 163.6 | 186.5 | 97.3 | 64.2 | 31.1 |
| Caprolactam | 104.0 | 169.0 | 157.0 | 279.0 | 234.0 | 273.0 | 312.0 |
| Terephthaloyl bis-caprolactam | 51.5 | 49.7 | 29.3 | 34.0 | 18.3 | 12.8 | 7.3 |
| Santowhite Powder** | 1.0 | 1.0 | 0.7 | 1.0 | 0.7 | 0.7 | 0.7 |
| Wt % of glycol in copolymer | 68 | 56 | 47 | 37 | 28 | 18 | 9 |

*polypropylene glycol having a molecular weight of 2000
**antioxidant, 4,4'-butylidne bis (6-tert-butyl-m-cresol)

In each of the above runs, the polypropylene glycol, caprolactam, Santowhite Powder and terephthaloyl bis-caprolactam are mixed together at 100° C. To the resultant solution, bromomagnesium pyrrolidinone is added in a concentration which provides 8 millimoles of the bromomagnesium pyrrolidinone per mole of caprolactam. The reaction mixture is then poured into a sheet mold heated to 100° C. and having a thickness varying between ⅛ and ½ inch. The mold is heated to 160° C. over a 12 minute period. After a 30 minute period, the mold is opened and the finished polymerized composition removed. Samples of each composition are tested to determine their mechanical properties, which are reported in Table 2 below.

TABLE 2

| | Tensile | | | Tear | Compressive | | Izod |
|---|---|---|---|---|---|---|---|
| | Strength, psi | | % Elong. | Modulus | Str. | Str. | Set | | Impact |
| Terpolymer | Yield | Fail | at Break | Psi | Psi | 25% | R.T. | 100% | ft. lbs. |
| A-68% Pluracol | | 1300 | 372 | | 350 | 550 | 8556 | | 85 |
| B-56% Pluracol | | 2140 | 527 | | 410 | | 2245 | | 92 |
| C-47% Pluracol | | 3900 | 505 | | 540 | 2600 | 33 | | 64 |
| D-37% Pluracol | | 5300 | 493 | | 803 | 4500 | 42 | | 67 |
| E-28% Pluracol | | 6100 | 450 | | 990 | 6900 | 52 | | 62 |
| F-18% Pluracol | 6400 | 6100 | 285 | | 1310 | 10800 | 69 | | 63 |
| G-9% Pluracol | 9500 | 7800 | 35 | | 1240 | 11400 | 60 | | 60 |
| Polycaprolactam | 10800 | 7900 | 50 | 220100 | | | | | |

EXAMPLE 2

Seven different caprolactam-polytetramethylene glycol-terephthaloyl bis-caprolactam terpolymers are prepared using the quantities of ingredients specified in the following table.

TABLE 3

| Material | A | B | C | D | E | F | G |
|---|---|---|---|---|---|---|---|
| Polymeg* | 229.0 | 196.0 | 163.0 | 130.0 | 97.0 | 64.0 | 31.0 |
| Caprolactam | 79.0 | 117.0 | 156.0 | 195.0 | 234.0 | 273.0 | 311.0 |
| T B C** | 42.5 | 36.7 | 30.9 | 25.1 | 19.3 | 13.4 | 7.6 |
| Santowhite Powder | 0.7 | 0.7 | 0.7 | 0.7 | 0.7 | 0.7 | 0.7 |
| Wt % glycol in copolymer | 65 | 56 | 47 | 37 | 28 | 18 | 9 |

*polytetramethylene glycol with a molecular weight of about 2000.
**terephthaloyl bis-caprolactam In each of the above runs, the polytetramethylene glycol, caprolactam, Santowhite Powder and terephthaloyl bis-caprolactam are mixed together at 100° C. As in Example 1, bromomagnesium pyrrolidinone is added and the resultant mixture is heated to 120° C. and cast into the mold which has been preheated to 100° C. The mold is then heated to 160° C. as in Example 1 and held at that temperature for 30 minutes, after which time it is opened and the samples removed. Table 4 below is a report of the mechanical properties of the compositions prepared.

TABLE 4

| Terpolymer | Tensile Strength, psi Yield | Tensile Strength, psi Fail | % Elong. at Break | Modulus Psi | Tear Str. Psi | Compressive Str. 25% | Compressive Set R.T. | Compressive Set 100% | Izod Impact ft. lbs. |
|---|---|---|---|---|---|---|---|---|---|
| A-65% Polymeg | | 2900 | 720 | | | 870 | 43 | | NB |
| B-56% Polymeg | | | | | | 1600 | 55 | | NB |
| C-47% Polymeg | | 4600 | 490 | | | 3000 | 35 | | NB |
| D-37% Polymeg | | 5900 | 520 | | 940 | 4700 | 43 | | NB |
| E-28% Polymeg | | 7000 | 450 | | 1200 | 7600 | 52 | | NB |
| F-18% Polymeg | 7100 | 7500 | 340 | | 1600 | 10300 | 63 | | 19.2 |
| G-9% Polymeg | 8900 | 9200 | 89 | | 1500 | 15900 | 52 | | 2.2 |

NB : sample did not break into two pieces

EXAMPLE 3

Seven different caprolactam-crosslinked polypropylene glycol terephthaloyl bis-caprolactam terpolymers are prepared using the quantities of ingredients specified in Table 5.

TABLE 5

| Material | A | B | C | D | E | F | G |
|---|---|---|---|---|---|---|---|
| Niax 61-58* | 229.5 | 196.4 | 163.3 | 130.3 | 98.1 | 64.1 | 31.0 |
| Caprolactam | 79.0 | 118.0 | 157.0 | 195.0 | 233.0 | 273.0 | 312.0 |
| T B C | 41.2 | 35.6 | 30.0 | 24.3 | 18.7 | 13.1 | 7.5 |
| Santowhite Powder | 0.7 | 0.7 | 0.7 | 0.7 | 0.7 | 0.7 | 0.7 |
| B M P** | 5.0 | 5.0 | 5.0 | 5.0 | 5.0 | 5.0 | 4.4 |
| Wt. % glycol | 66 | 56 | 47 | 37 | 28 | 18 | 9 |
| solution temp. | 160 | 140 | 120 | 120 | 120 | 120 | 120 |
| initial mold temp. | 160 | 140 | 110 | 110 | 110 | 120 | 120 |

*multifunctional polypropylene glycol of 2000 mol. wt.
**bromomagnesium pyrrolidinone Each of the seven runs is carried out according to the procedure set forth in Examples 1 and 2 except that the temperature and catalyst concentration are varied as shown in the above table. Properties are reported in Table 6 below.

TABLE 6

| Terpolymer | Tensile Strength, psi Yield | Tensile Strength, psi Fail | % Elong. at Break | Modulus Psi | Tear Str. Psi | Compressive Str. 25% | Compressive Set R.T. | Compressive Set 100% | Izod Impact ft. lbs. |
|---|---|---|---|---|---|---|---|---|---|
| A-66% Niax | | 800 | 232 | | 170 | 660 | 23 | 66 | |
| B-56% Niax | | 1600 | 302 | | 240 | 1050 | 39 | 66 | |
| C-47% Niax | | 3700 | 420 | | 375 | 2100 | 25 | 66 | |
| D-37% Niax | | 5700 | 402 | | 550 | 3500 | 47 | 66 | |
| E-28% Niax | | 7200 | 557 | | 956 | 6400 | 62 | 53 | |
| F-18% Niax | 6100 | 6900 | 305 | | 1400 | 10600 | 58 | 66 | |
| G-9% Niax | 9300 | 8500 | 52 | | 1700 | 15700 | 62 | 56 | 1.8 |

EXAMPLE 4

Two caprolactam-polybutadiene diol-isophthaloyl biscaprolactam terpolymers are prepared using the quantities of ingredients specified in Table 7.

TABLE 7

| Material, gms. | A | B |
|---|---|---|
| Arco R-45 M | 165.8 | 131.8 |
| Caprolactam | 155.0 | 193.0 |
| IBC** | 24.6 | 20.1 |
| Santowhite Powder | 0.8 | 0.8 |
| Wt % glycol | 48 | 38 |
| Solution Temp. °C. | 90 | 90 |
| Initial Mold temp. | 100 | 100 |
| Final mold temp. | 170 | 170 |

*polybutadiene diol of 2000 ml wt.
**isophthaloyl bis-caprolactam

The two terpolymers are prepared according to the procedure set forth in Examples 1 and 2 using the solution temperatures and mold temperatures specified in Table 7. The catalyst, bromomagnesium pyrrolidinone, is used in a concentration of 5 millimoles per mole of caprolactam. Properties are reported in Table 8.

TABLE 8

| Terpolymer | Tensile Strength, psi Yield | Tensile Strength, psi Fail | % Elong. at Break | Modulus Psi | Tear Str. Psi | Compressive Str. 25% | Compressive Set R.T. | Compressive Set 100% | Izod Impact ft. lbs. |
|---|---|---|---|---|---|---|---|---|---|
| A-48 Arco R-45 M | | 2100 | 230 | 10000 | | | 27 | | |

EXAMPLE 5

Eight caprolactam-polyethylene glycol-terephthaloylcaprolactam terpolymers are prepared using the quantities of ingredients and the solution temperatures and mold temperatures specified in Table 9. Properties of the compositions are reported in Table 10.

TABLE 9

| Material | A | B | C | D | E | F | G | H |
|---|---|---|---|---|---|---|---|---|
| Carbowax 4000* | 229.1 | 241.2 | 141.7 | 60.0 | 46.6 | 13.8 | 9.0 | 4.2 |
| Caprolactam | 42.0 | 107.0 | 137.0 | 152.5 | 146.0 | 84.0 | 89.2 | 94.6 |
| TBC | 48.1 | 50.5 | 21.1 | 12.5 | 7.6 | 2.5 | 1.8 | 1.2 |
| Irganox 1010** | 0.9 | 0.9 | | 0.4 | | | | |
| Santowhite Powder | | | 0.6 | | | | | |
| BMP*** (mmoles/mole capro) | 10.7 | 10.7 | 8.0 | 4.5 | 3.3 | 5.0 | 5.0 | 5.0 |
| Wt. % glycol | 72 | 61 | 46 | 30 | 23 | 14 | 9 | 4 |

*a polyethylene glycol having a 4000 mol. wt.
**tetrakis (methylene 3-(3'-5'di-tert-butyl-4'-hydroxyphenyl propionate)methane, an antioxidant
***BMP-bromomagnesium pyrrolidinone

TABLE 10

| | Tensile | | | Tear | Compressive | | Izod |
|---|---|---|---|---|---|---|---|
| | Strength psi | | % Elong. | Modulus | Str. | Str. | Set | Impact |
| Terpolymer | Yield | Fail | at Break | Psi | Psi | 25% | R.T. 100% | ft. lbs. |
| A-72% Carbowax | | 2300 | 610 | | | | | |
| B-61% | | 1700 | 150 | | | | | |
| C-46% | | 6000 | 705 | | | | | |
| D-30% | | 6500 | 505 | 117,000 | | | | |
| E-23% | 5600 | 8400 | 650 | | 1510 | 1230 | | |
| F-14% | 6100 | 10,400 | 432 | 123,000 | | | | |
| G-9% | 7300 | 10,400 | 328 | 170,000 | | | | |
| H-4% | 8800 | 9,300 | 264 | 210,000 | | | | |

EXAMPLE 6

Two caprolactam-caprolactone diol-terephthaloyl bis-caprolactam terpolymers are prepared using the quantities of ingredients and the solution temperatures and mold temperatures specified in Table II. The catalyst, bromomagnesium pyrrolidinone, is used in a concentration of 7.7 millimoles per mole of caprolactam. Properties of the compositions are reported in Table 12.

TABLE 11

| Material | A | B |
|---|---|---|
| Niax PCP-0240* | 195.0 | 175.0 |
| Caprolactam | 69.0 | 141.0 |
| TCB | 36.3 | 33.6 |
| Santowhite Powder | 0.6 | 0.7 |
| Solution Temp. °C. | 90 | 100 |
| Initial Mold Temp. | 90 | 90 |
| Final Mold Temp. | 160 | 160 |
| Wt. % Polycaprolactone diol | 65 | 50 |

*polycaprolactone diol

TABLE 12

| | Tensile | | | Tear | Compressive | | Izod |
|---|---|---|---|---|---|---|---|
| | Strength, psi | | % Elong. | Modulus | Str. | Str. | Set | Impact |
| Terpolymer | Yield | Fail | at Break | Psi | Psi | 25% | R.T. 100% | ft. lb. |
| A-65% polycaprolactone | | 3000 | 940 | 3000 | 662 | | | |
| B-50% diolcaprolactone | | 5600 | 800 | 15,000 | | | | |

EXAMPLE 7

The purpose of this example is to ascertain the effect on mechanical properties of varying the molecular weight of the polyol segment of the terpolymers. The last three samples prepared, Compositions D, E and F, demonstrate the effect of crosslinking on the same properties. The terpolymers are prepared using the ingredients and the process conditions set forth in Table 13 below. The catalyst, bromomagnesium pyrrolidinone, is used in a concentration of 5 millimoles of catalyst per mole of caprolactam. Properties are reported in Table 14.

TABLE 13

| Material | A | B | C | D | E | F |
|---|---|---|---|---|---|---|
| Voranol type* | P1010 | P2000 | P4000 | P4000 | P4000 | P4000 |
| Voranol, gms. | 155.2 | 163.3 | 168.5 | 159.6 | 138.8 | 126.4 |
| Pluracol 3030, gms.** | 0 | 0 | 0 | 8.6 | 29.0 | 40.8 |
| Caprolactam, gms. | 143 | 157 | 166 | 165 | 164 | 163 |
| IBC, gms*** | 52.3 | 30.2 | 15.8 | 16.6 | 17.9 | 19.4 |
| Wt. % triol | 0 | 0 | 0 | 2.5 | 8.3 | 11.7 |
| Wt % total polyol | 44 | 47 | 48 | 48 | 48 | 48 |

*a polypropylene glycol with a molecular weight equivalent to the numerical designation following the trade name
**a polypropylene triol
***isophthaloyl bis-caprolactam

TABLE 8-continued

| | Tensile | | | Tear | Compressive | | Izod |
|---|---|---|---|---|---|---|---|
| | Strength, psi | | % Elong. | Modulus | Str. | Str. | Set | Impact |
| Terpolymer | Yield | Fail | at Break | Psi | Psi | 25% | R.T. 100% | ft. lbs. |
| B-38 Arco R-45 M | | 3000 | 212 | 26000 | | | 37 | |

TABLE 14

| Terpolymer | Tensile Strength, psi Yield | Tensile Strength, psi Fail | % Elong. at Break | Modulus Psi | Tear Str. Psi | Compressive Str. 25% | Compressive Set R.T. | Compressive Set 100% | Izod Impact ft. lb. |
|---|---|---|---|---|---|---|---|---|---|
| A-44% polyol | | 5100 | 750 | 19,000 | | | | | |
| B-47% polyol | | 5400 | 700 | 24,000 | 600 | 2200 | | | |
| C-48% polyol | | 2100 | 285 | 38,000 | 580 | 2400 | | | |
| D-48% polyol (2.5% triol) | | 2500 | 357 | 36,000 | 360 | 2500 | | | |
| E-48% polyol (8.3% triol) | | 2700 | 337 | 19,000 | 310 | 2200 | | | |
| F-48% polyol (11.7% triol) | | 2800 | 400 | 19,000 | 310 | 1800 | | | |

EXAMPLE 8

A quantity of 35 gms. epsilon caprolactam and 150 ml. toluene was heated to reflux toluene and dry the solution by azeotroping water from the mixture. The solution was cooled to 30° C. and 25 ml. pyridine was added. A solution of 25 grams trimesoyl chloride in 25 ml. toluene was then added to the stirring solution. After an initial temperature rise to 70° C., the mixture was heated to reflux the toluene for one hour. The pyridine hydrochloride solids which formed from reaction were removed by filtration of the hot mixture. Solids were washed with benzene which was added to the filtrate. The solution was concentrated to 200 ml by boiling and allowed to stand 12–18 hours. The resulting trimesoyl-tris-caprolactam precipitate was filtered, washed with benzene and dried in a vacuum oven.

EXAMPLE 9

A crosslinked terpolymer was prepared using the quantities of ingredients listed in Table 15. The catalyst, bromomagnesium caprolactam (prepared by reaction of ethyl magnesium bromide with caprolactam) was used in a concentration of 5 millimoles per mole of caprolactam.

TABLE 15

| Material | |
|---|---|
| Voranol 2000-gms | 60.0 |
| Trimesoyl tris-caprolactam-gms | 11.0 |
| Caprolactam-gms | 138.0 |
| Flectol H-gms | 1.0 |
| BMC*-ml | 15.5 |

BMC-0.4 molar bromomagnesium caprolactam in molten caprolactam.

The Voranol 2000, trimesoyl tris caprolactam and Flectol H were heated with stirring under vacuum to dry the mixture by distilling 25 gms. caprolactam. The solution was cooled to 100° C. and cast into a 100° C. mold by means of a metering pump. Catalyst was injected into the mixture by means of a second metering pump. Mixing of the reactant streams was accomplished by means of a Kenics static mixer. The reaction mixture set into a firm gel within 15 seconds after casting. The mold was then heated to 160° C. and maintained at this temperature for 30 minutes after which time the mold was opened and the sample removed. Table 16 below is a report of the tensile properties of the terpolymer.

TABLE 16

| Tensile Strength | 6320 PSI |
|---|---|
| % Elongation | 295% |

TABLE 16-continued

| Tensile Modulus | 76,000 PSI |
|---|---|

What we claim is:

1. A lactam-polyol-polyacyl lactam block terpolymer having the general formula:

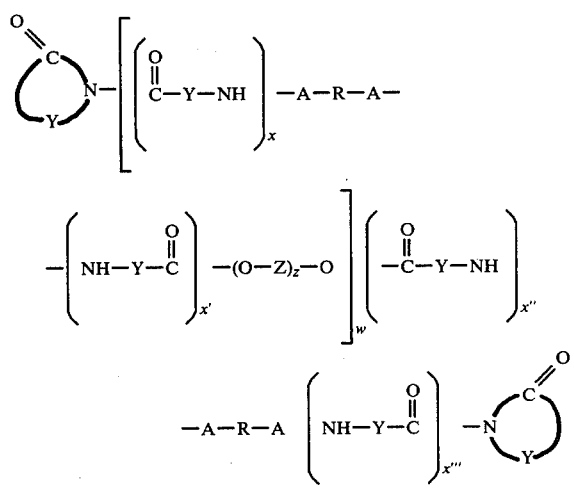

wherein $(O-Z)_z$ is a polymeric moiety and Z is a hydrocarbon or substituted hydrocarbon group said group being alkylene, arylene, alkylene carbonyl, arylene carbonyl, and mixtures thereof;

A is a carbonyl group;

R is a divalent or polyvalent hydrocarbon group comprised of from 1 to 4 carbon atoms;

Y is an alkylene or substituted alkylene having from about 3 to about 14 carbon atoms; x, x', x", and x''' are integers with at least one x being an integer greater than one, and the total number of x's is equal to $2w + 2$; and z is an integer equal to one or more and w is an integer greater than one.

2. The lactam-polyol-polyacyl lactam block terpolymer according to claim 1 wherein the R group is comprised of four carbon atoms.

3. The lactam-polyol-polyacyl lactam block terpolymer according to claim 2 wherein the R group is tetramethylene.

4. A terpolymer according to claim 1 wherein the polyol portion of the terpolymer is formed from polybutadiene diol.

5. A terpolymer according to claim 1 wherein the polyol portion of the terpolymer is formed from a polyester.

6. A terpolymer according to claim 5 wherein said polyester is polycaprolactone diol.

* * * * *